Figure 1:
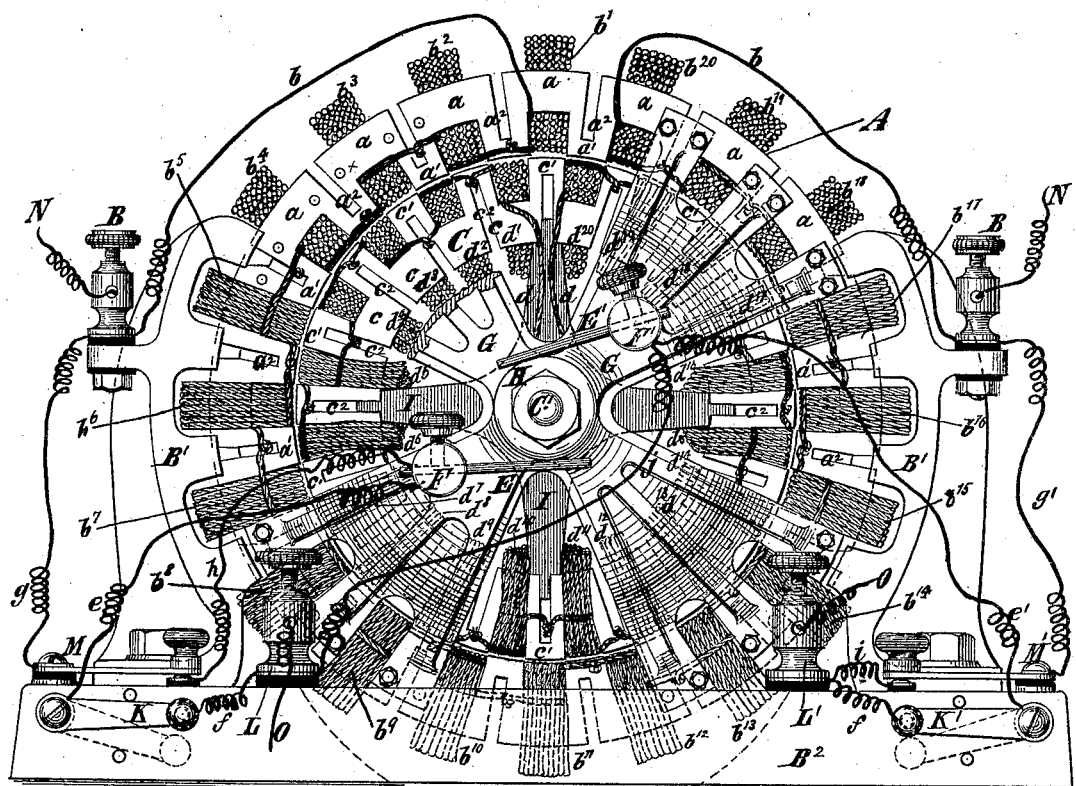

(No Model.) 2 Sheets—Sheet 1.

C. A. HUSSEY.
DYNAMO ELECTRIC MACHINE.

No. 252,380. Patented Jan. 17, 1882.

Witnesses
J. J. Keane
Jas. R. Bowen.

Inventor
C. A. Hussey (No Model.) 2 Sheets—Sheet 2.

C. A. HUSSEY.
DYNAMO ELECTRIC MACHINE.

No. 252,380. Patented Jan. 17, 1882.

Witnesses
T. J. Keane
Jus. R. Bowen

Inventor
C. A. Hussey

United States Patent Office.

CHARLES A. HUSSEY, OF NEW YORK, N. Y., ASSIGNOR TO THE HUSSEY ELECTRIC COMPANY, OF SAME PLACE.

DYNAMO-ELECTRIC MACHINE.

SPECIFICATION forming part of Letters Patent No. 252,380, dated January 17, 1882.

Application filed September 7, 1881. (No model.)

*To all whom it may concern:*

Be it known that I, CHARLES A. HUSSEY, of New York, in the county and State of New York, have invented certain new and useful Improvements in Dynamo Electric Machines, of which the following is a specification.

It is known that in dynamo-electric machines as ordinarily constructed only those coils of wire which are passing between the poles or consequent points of the field-magnets are effective in producing currents of electricity, and that the other coils of the armature are for the time rather detrimental than otherwise, because they offer a resistance to the passage of the current of electricity produced.

One object of my present improvements is to obviate this defect; and to this end the improvements consist in the combination, in a dynamo-electric machine, of a field-magnet and an armature severally having cores composed of arc-shaped portions wound with wire, intervening arc-shaped portions, and radial portions connecting the said arc-shaped portions which are wound with wire to the intervening portions, the radial portions of both the field-magnet and armature forming poles, polar extensions, or consequent points, and extending toward each other. The field-magnet core will preferably be made of one integral piece of metal and the armature-core of many thin pieces of metal. I consider a novel field-magnet of itself a feature of my improvements.

Another object of my improvements is to provide a dynamo-electric machine which may be used to produce an alternate current or currents of electricity, or to produce a direct electric current and be susceptible of use as a motor.

To this end the improvements further consist in the combination, with a field-magnet and armature, of means whereby a current of electricity may be made to traverse the coils of the field-magnet from a source outside of the machine and the circuit between the coils of wire on the field-magnet and the coils of wire of the armature may be severed to cause the machine to produce an alternate current or currents of electricity; or the supply of electricity to the coils of the field-magnet from an outside source may be cut off and the circuit established between the coils of the field-magnet and the coils of the armature to cause the machine to produce a direct current of electricity. The means employed for this purpose may consist of switches of any suitable kind.

Figure 2:
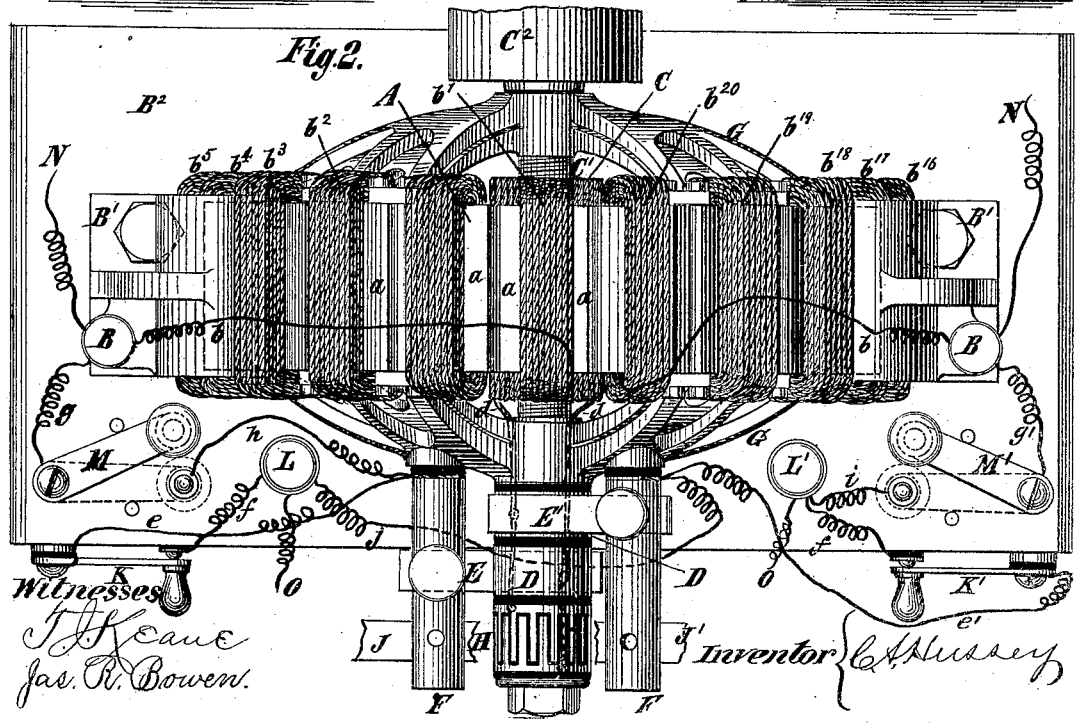
Figure 3:
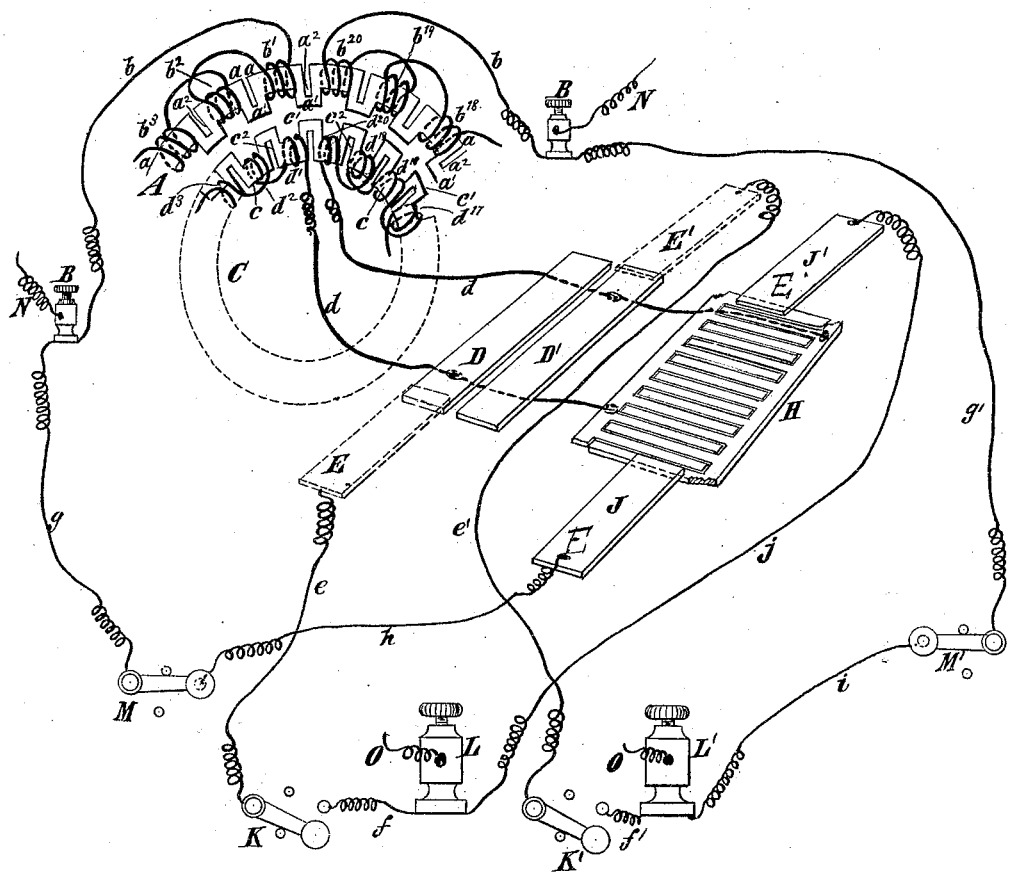

In the accompanying drawings, Figure 1 is a sectional end elevation of a dynamo electric machine and motor embodying my improvements. Fig. 2 is a plan of the same, and Fig. 3 is a diagram illustrative thereof.

Similar letters of reference designate corresponding parts in all the figures.

A designates the field-magnet of this machine and motor. The core may be made of cast-iron, wrought-iron, or other suitable material, and of one integral piece of such material. As here shown it is composed of a number of coincident arc-shaped portions, $a$, of large radii, a number of intervening coincident arc-shaped portions, $a'$, of smaller radii, and approximately radial portions $a^2$, connecting the arc-shaped portions $a$ with the intervening arc-shaped portions $a'$. Coils of insulated wire are wound around the arc-shaped portions $a$, between the radial portions $a^2$, and preferably they are coincident with the inner surface of the arc-shaped portions $a'$, as shown in Fig. 1. These coils may be all wound in one and the same direction, as represented in Fig. 1 and 2; but they will then be connected together, so that the electric current which is supplied to them will traverse alternate coils in the reverse direction.

Beginning with coil $b'$, it will be observed that its outer end is connected to the outer end of the next coil, $b^2$, that the inner end of the coil $b^2$ is connected to the inner end of the coil $b^3$, that the outer end of the coil $b^3$ is connected to the outer end of the coil $b^4$, and so on to the coil $b^{20}$. Wires $b$ extend from the inner ends of the coils $b'$ and $b^{20}$ to binding-posts B, which are mounted on standards B', whereby the field-magnet is supported. As the coils are severally wound from corresponding starting-points and terminate at corresponding points, it is obvious that by connecting them in the manner just described the electric current will be caused to traverse them in the desired manner.

The standards B' are erected on a base-piece, B², and are secured to the core of the field-magnets between certain of the coils of wire which are wound thereon. The binding-posts B are insulated from the standards by gaskets of hard rubber or other suitable material. The several arc-shaped portions $a$, wound with the coils of wire, and the contiguous radial portions $a^2$, may be regarded as constituting a number of bar electro-magnets having the ends or poles turned inward, and, owing to their coils being so connected that the current of electricity will traverse adjacent coils in reverse directions, such magnets have their poles of like name in proximity to each other. The arc-shaped portions $a'$ of the field-magnet core may be regarded as connections between the poles of like name of the different electro-magnets.

The current of electricity employed for magnetizing the field-magnet will pass to the coils of the field-magnet by one of the wires $b$, and from them by the other wire $b$. Obviously the coils of wire of the field-magnet can be wound and connected differently to cause the electric current to traverse them alternately in reversed directions.

C designates the armature of the machine and motor. It is composed of a number of coincident arc-shaped portions, $c$, of short radii, a number of coincident intervening arc-shaped portions, $c'$, of longer radii, and approximately radial portions $c^2$, connecting the arc-shaped portions $c$ with the intervening arc-shaped portions $c'$. Coils of insulated wire are wound around the arc-shaped portions $c$, between the radial portions $c^2$. They are all wound in the same direction and start and end at corresponding points. The coil $d'$ has its outer end connected with the outer end of the adjacent coil $d^2$, the coil $d^2$ has its inner end connected to the inner end of the coil $d^3$, the outer end of the coil $d^3$ is connected with the outer end of the coil $d^4$, and so on are the several coils connected around the armature. The armature may therefore be regarded as composed of a number of bar electro-magnets having their ends or poles extended outward, and arranged with their poles of like name in proximity to each other. The arc-shaped portions $c'$ of the armature-core may then be regarded as connections between the ends or poles of such magnets. Of course in the operation of the armature the polarity of these magnets will constantly change.

Insulated wires $d$ extend one from the inner end of the coil $d'$ to a metallic ring, D, mounted on the shaft C' of the armature, and the other from the inner end of the coil $d^{20}$ to a metallic ring, D', which is also mounted on the said shaft. These rings D D' are insulated from each other and from the shaft by gaskets of hard rubber or other suitable material. In electrical communication with these rings are metallic brushes E E', which are supported in metallic posts F F', mounted in one of two spiders, G, attached to the field-magnet core, and furnished with bearings for the journals of the armature-shaft C'. The wires $d$ extend beyond the rings D D', one to each of two metallic plates of a commutator, H, which is also mounted on the armature-shaft C'. The two plates of this armature consist of bands provided with a number of strips or fingers, and the fingers of one strip extend between those of the other strip. These plates are not, however, in electrical contact, but are insulated from each other by means of a cylinder of hard rubber or other suitable material, to which they are fastened. The whole commutator is also insulated by this cylinder from the rings D D', and likewise from the armature-shaft. The strips or fingers of each commutator-plate equal in number and correspond to one-half of the coils of wire $d$ $a^2$, &c., of the armature.

J J' designate the positions into which the metallic brushes E E' are adjusted to cause them to bear on the commutator.

The armature core, instead of being made of one integral piece like the core of the field-magnet, is preferably composed of a number of very thin plates of wrought-iron or other suitable material. These plates may be secured together by means of bolts extending through them, or in any other suitable manner. The armature-core has fitted between certain of its radial portions $c^2$ the ends of spiders I, which fit upon and are rigidly secured to the armature-shaft C'. By making the core of the field-magnet of one integral piece of metal and the core of the armature of a large number of pieces, the latter will magnetize and demagnetize much more rapidly than the former; and this is very desirable where the current of electricity for the field-magnet is to be supplied from the armature, because then the field-magnet core will have some residual magnetism, sufficient to produce an initial current of electricity in the armature-coils.

It will be observed that not only do the poles of the field-magnet and armature extend toward each other, but that they and the coils correspond in number. The armature, when rotated, travels before and in close proximity to the poles of the field-magnets and the whole length of the field-magnet, and hence through the entire field of force. It may be driven by a belt applied to a pulley, $C^2$, mounted on its shaft.

I have already alluded to the defect which exists in dynamo-electric machines constructed in the ordinary manner, and is due to the fact that a current of electricity is produced only in coils of wire on the armature which are passing between the poles or consequent points of the field-magnet, and that the other coils for the time are not merely useless, but are detrimental because of the resistance they offer to the passage of the current of electricity. In the machine I have been describing this defect is remedied, because, as the poles or polar projections and coils of wire of the field-magnet and armature correspond in number, all the coils of wire of the armature are simultaneously passing between the poles or polar extensions of the field-magnets.

I will now continue my description of this machine with a view of explaining the means whereby and the manner in which it may be adapted to produce an alternate current or currents or a direct current at the pleasure of the user. In doing this I ask particular attention to the diagram, Fig. 3, although reference may also be had to the other figures.

From the brushes E E' wires e e' extend to switches K K', which control communication between these wires e e' and wires f f', which lead to binding-posts L L'. From the binding-posts B wires g g' extend to switches M M'. The switch M controls communication between the wire g and a wire, h, leading to the brush E, when it is adjusted to the position indicated by J, to bear on the commutator H. The switch M' controls communication between the wire g' and a wire, i, which leads to the binding-post L'. A wire, j, leads from the brush E', when it is in the position indicated by J', to the binding-post L. Wires N lead to the binding-posts B, and wires O lead from the binding-posts L L'. The wires O may be regarded as an outside circuit in contradistinction to the machine-circuit. When the switches M M' are closed and the switches K K' are opened, as shown in Fig. 3, the coils of the armature are in circuit with the coils of the field-magnet, and the electric currents generated in the armature will be directed by the commutator, and, after passing through the coils of the field-magnet, may be conducted off by the wires O O.

If, instead of applying power to the armature for the purpose of rotating it, a current of electricity is supplied from an outside source along the wires O, the machine will operate as a motor.

To adapt the machine to produce an alternate current or currents it is only necessary to shift the brushes E E' out of contact with the commutator H and into contact with the rings D D', open the switches M M', close the switches K K', as shown in Figs. 1 and 2, and to supply a current of electricity to the wires N for traversing the coils of the field-magnet. The commutator will then be rendered inoperative, and the alternate electric current or currents will be conducted from the armature, by the rings D D', brushes E E' and wires e e', switches K K', and wires f f', to the binding-posts L L' and wires O O.

It will have been seen that by my improvements I produce an exceedingly effective dynamo-electric machine, and one that will form a very desirable motor, and may be adapted to produce either a direct current or an alternate current or currents at the pleasure of the user.

What I claim as my invention, and desire to secure by Letters Patent, is—

1. The combination, in a dynamo-electric machine, of a field-magnet and an armature severally having cores composed of arc-shaped portions wound with wire, intervening arc-shaped portions, and radial portions connecting the said arc-shaped portions which are wound with wire to the intervening portions, the radial portions of both the field-magnet and armature forming poles, polar extensions, or consequent points, and extending toward each other, substantially as specified.

2. A field-magnet for a dynamo-electric machine, having a core composed of arc-shaped portions wound with coils of wire, intervening arc-shaped portions of shorter radii, and radial portions which connect the two series of arc-shaped portions, substantially as specified.

3. The combination, in a dynamo-electric machine, of a field-magnet having a core made of one integral piece of metal, and an armature having a core composed of a number of pieces or plates of metal, both cores having a corresponding number of arc-shaped portions wound with wire, from which extend radial portions forming poles, polar extensions, or consequent points, substantially as specified.

4. The combination, with a field-magnet and armature in a dynamo-electric machine, of means, substantially such as described, whereby a current of electricity may be made to traverse the coils of the field-magnet from a source outside the machine, and the circuit between the coils of wire of the field-magnet and the coils of the armature may be severed to cause the machine to produce an alternate current or currents, or the supply of electricity to the coils of the field-magnet from an outside source may be cut off and the circuit established between the coils of wire of the field-magnet and the coils of the armature to cause the machine to produce a direct current of electricity, substantially as specified.

5. The combination, with a field-magnet and armature in a dynamo-electric machine, of switches and suitable connecting-wires, whereby a current of electricity from a source outside of the machine may be made to traverse the coils of the field-magnet and the circuit between the coils of wire of the field-magnet and the coils of the armature may be severed, or the supply of electricity to the coils of the field-magnet from an outside source may be cut off and the circuit established between the coils of the field-magnet and the coils of the armature, substantially as and for the purposes set forth.

6. The combination, with a dynamo-electric machine and an outside circuit, of wires N, communicating with the wires b of the field-magnet, the wires d of the armature, the rings D D', the brushes E E', the wires e e', the switches K K', controlling communication between the wires e e' and the outside circuit, the commutator H, to which the wires d of the armature also lead, the wires g h, the switch M, the wire j, the wire g', the switch M', and the wire i, substantially as and for the purpose specified.

C. A. HUSSEY.

Witnesses:
T. J. KEANE,
JAS. R. BOWEN.